United States Patent
Yamanaka

[11] Patent Number: 6,031,696
[45] Date of Patent: Feb. 29, 2000

[54] THIN-FILM MAGNETIC HEAD HAVING CONDUCTIVE MATERIAL CONTACTING SIDES OF THE UPPER POLE LAYER AND AN UPPER SURFACE OF THE LOWER POLE LAYER

[75] Inventor: Noboru Yamanaka, Nagano, Japan

[73] Assignee: TDK Corporation, Tokyo, Japan

[21] Appl. No.: 09/092,873

[22] Filed: Jun. 8, 1998

[30] Foreign Application Priority Data

Jun. 20, 1997 [JP] Japan ................................. 9-179139

[51] Int. Cl.⁷ .......................... G11B 5/147; G11B 5/187
[52] U.S. Cl. .......................................... 360/126; 360/122
[58] Field of Search ............................... 360/113, 119, 360/122, 126

[56] References Cited

U.S. PATENT DOCUMENTS

| | | | |
|---|---|---|---|
| 5,388,019 | 2/1995 | Argyle et al. | 360/126 |
| 5,402,295 | 3/1995 | Suzuki et al. | 360/126 |
| 5,673,163 | 9/1997 | Cohen | 360/126 |
| 5,726,841 | 3/1998 | Tong et al. | 360/122 |
| 5,734,533 | 3/1998 | Nepela | 360/119 |
| 5,802,700 | 9/1998 | Chen et al. | 360/126 |
| 5,850,326 | 12/1998 | Takano et al. | 360/122 |

FOREIGN PATENT DOCUMENTS

| | | |
|---|---|---|
| 56-156914 | 12/1981 | Japan . |
| 1-169714 | 7/1989 | Japan . |

*Primary Examiner*—Jefferson Evans
*Attorney, Agent, or Firm*—Nikaido, Marmelstein, Murray & Oram, LLP

[57] ABSTRACT

A thin-film magnetic head includes a recording gap layer, lower and upper magnetic pole layers deposited to sandwich the recording gap layer, the upper magnetic pole layer having side surfaces facing toward a track width direction, and non-magnetic conductive material members being in contact with at least a part of the respective side surfaces of the upper magnetic pole layer and in contact with the lower magnetic pole layer.

7 Claims, 6 Drawing Sheets

THIN-FILM MAGNETIC HEAD HAVING CONDUCTIVE MATERIAL CONTACTING SIDES OF THE UPPER POLE LAYER AND AN UPPER SURFACE OF THE LOWER POLE LAYER

FIELD OF THE INVENTION

The present invention relates to a thin-film magnetic head used for high density recording on a magnetic medium such as a magnetic disk.

DESCRIPTION OF THE RELATED ART

In response to the recent demand for higher density recording on the magnetic disk, the maximum required recording/reproducing frequency of the thin-film magnetic head increases to for example a high frequency of 100 MHz or more, and also the recording/reproducing track width of the thin-film magnetic head becomes narrower to 2.0 $\mu$m or less.

If the recording frequency increases, the eddy current loss of the magnetic head increases causing the recording magnetic field to decrease. To decrease the eddy current loss, in a conventional magnetic head, magnetic poles are made of a magnetic material with a large resistivity.

If the recording track width becomes narrow, the recording magnetic field may easily leak. In order to prevent this leakage magnetic field from generation, in the conventional magnetic head, track end surfaces (side surfaces) of the magnetic poles are trimmed. However, even using this trimming method, the leakage magnetic field cannot be sufficiently suppressed at the track ends of the magnetic head but some magnetic field leaks through a recording gap layer made of non-magnetic insulating material.

Japanese patent unexamined publication No.56(1981)-156914 describes a technology for decreasing the eddy current loss in the magnetic head. According to this technology, a conductive material member is disposed between upper and lower magnetic poles which constitute a part, of a magnetic path in the magnetic head without contacting with these poles. Thus, eddy current due to the leakage flux between the upper and lower poles flows through this conductive material member so as to reduce the leakage flux between the poles. However, this technology cannot suppress the leakage flux flowing out from the track ends of the magnetic poles.

Japanese patent unexamined publication No.1(1989)-169714 describes a technology for decreasing the leakage flux of the magnetic head. According to this technology, upper and lower magnetic poles are individually covered by conductive material members, respectively to flow eddy current. Thanks to the eddy current effect, the magnetic resistivity of the magnetic path increases to reduce the leakage flux from an adjacent head element. However, according to this latter technology, since the upper and lower magnetic poles are completely insulated with each other by a non-magnetic insulating material, no eddy current flows between the upper and lower magnetic poles. Thus, it is impossible to suppress the leakage flux flowing out from the track ends of the magnetic poles.

As will be noted from the above-description, there is no technology for suppressing both reduction in the magnetic field at high frequency range due to the eddy current and generation of leakage recording magnetic field at the track ends of the magnetic head.

SUMMARY OF THE INVENTION

It is therefore an object of the present invention to provide a high recording density thin-film magnetic head with a good characteristics, capable of suppressing both eddy current, loss and leakage recording magnetic filed.

According to the present invention, a thin-film magnetic head includes a recording gap layer, lower and upper magnetic pole layers deposited to sandwich the recording gap layer, the upper magnetic pole layer having side surfaces facing toward a track width direction, and non-magnetic conductive material members being in contact with at least a part of the respective side surfaces of the upper magnetic pole layer and in contact with the lower magnetic pole layer.

The eddy current flows not only within the magnetic poles as in the conventional magnetic head but also through the non-magnetic conductive material members which are formed in contact with the track end surfaces of the upper magnetic pole. In addition, the eddy current flows through the non-magnetic conductive material members so as to cancel out the leakage flux passing through these non-magnetic conductive material members. Therefore, the leakage flux is suppressed resulting the magnetic field passing through the recording gap layer to increase.

It is preferred that the upper magnetic pole layer has a front end portion, and that the non-magnetic conductive material members are in contact with a part of the respective side surfaces of the upper magnetic pole layer at least around the front end portion. Since the magnetic filed easily leaks through the side surfaces of this front end portion of the upper pole layer, it is very effective to form the non-magnetic conductive material members at this portion for suppressing the leakage flux by the eddy current.

It is also preferred that the upper magnetic pole layer has a front end portion and a sloped portion located behind the front end portion, and that the non-magnetic conductive material members are in contact with a part of the respective side surfaces of the upper magnetic pole layer from the front end portion to the sloped portion. The magnetic filed also easily leaks through the side surfaces of this sloped portion of the upper pole layer. Thus, it is very effective to form the non-magnetic conductive material members at this portion for suppressing the leakage flux by the eddy current.

It is further preferred that the non-magnetic conductive material members are integral with the recording gap layer. Since the leakage flux passing through the gap is suppressed by the eddy current, the recording magnetic field can be increased.

The magnetic head may be an integral composite thin-film magnetic head with an inductive recording head part and a magnetoresistive (MR) reproducing head part, or a thin-film magnetic head with only an inductive recording head part.

Further objects and advantages of the present invention will be apparent from the following description of the preferred embodiments of the invention as illustrated in the accompanying drawings.

DESCRIPTION OF THE PREFERRED EMBODIMENTS

Figure 1:
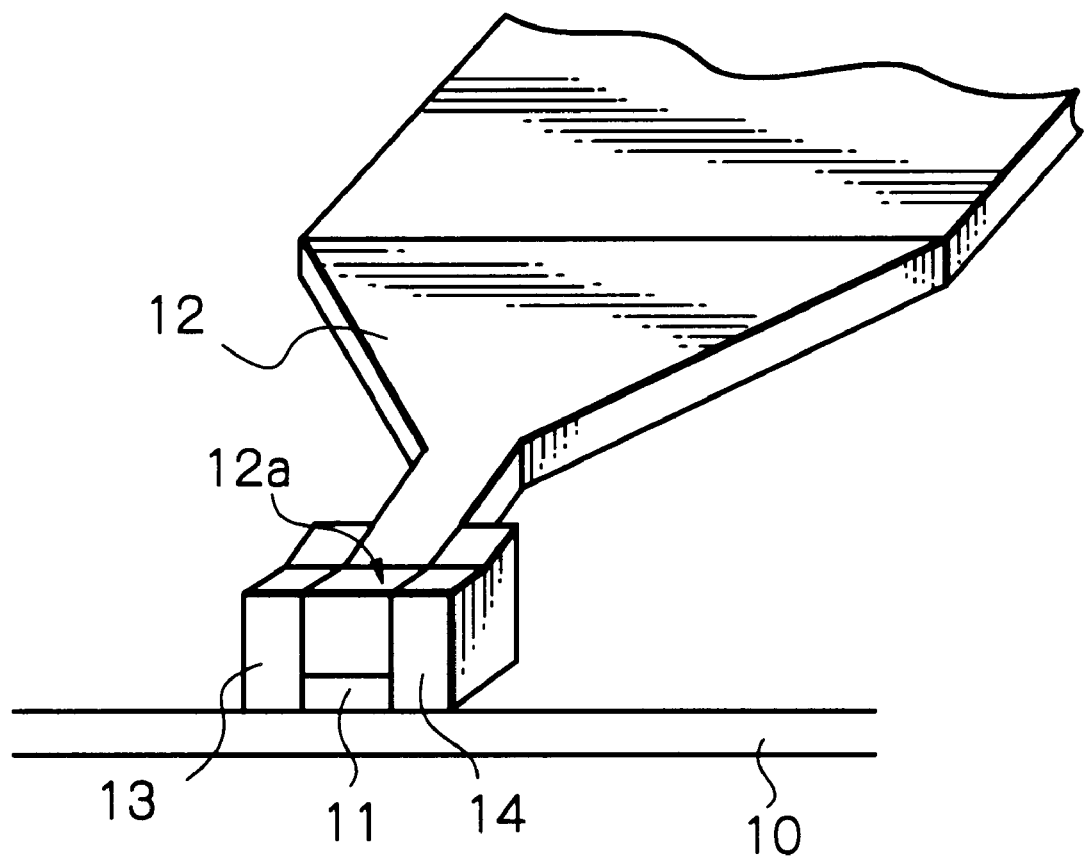
FIG. 1 shows an oblique view schematically illustrating a structure of a pole portion of a thin-film magnetic head in a preferred embodiment according to the present invention.

FIG. 1 schematically illustrates a structure or a pole portion of a thin-film magnetic head in a preferred embodiment according to the present invention, and is an oblique view seen from the ABS (Air Bearing Surface) of the head. In this embodiment, the magnetic head is an integral composite thin-film magnetic head with an inductive recording head part and MR reproducing head part.

In the figure, reference numeral 10 denotes a lower magnetic pole layer of the inductive head part. This pole layer 10 also operates as an upper shield layer for the MR head part. In the figure, furthermore, reference numeral 11 denotes a recording gap layer, 12 denotes an upper magnetic pole layer, and 13 and 14 denote a pair of non-magnetic conductive material members formed on the layer 10 in contact with respective side surfaces (track end surfaces facing toward the track width direction) of the front end portion 12a of the upper pole layer 12.

The lower pole layer (upper shield layer) 10 and upper pole layer 12 are, in this embodiment, plated layers made of typical material for magnetic pole such as NiFe. Instead of NiFe, another well known material for magnetic pole can be of course used.

The recording gap layer 11 is, in this embodiment, made of typical material for insulating layer such as $Al_2O_3$. Instead of $Al_2O_3$, another well known material for the gap can be of course used.

The non-magnetic conductive members 13 and 14 are made of for example Al, Al alloy, Cu, Cu alloy, Au or Au alloy.

Figure 2:
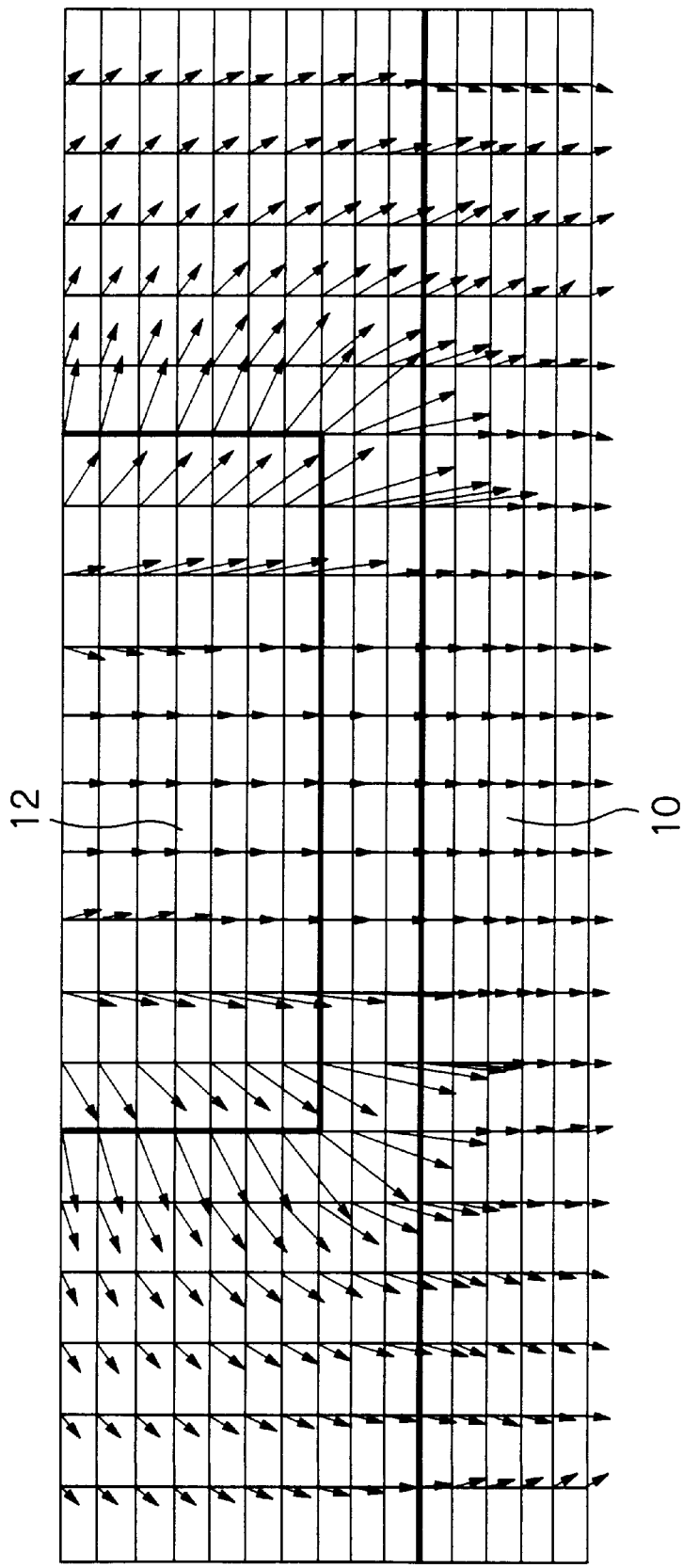
FIG. 2 illustrates distribution of magnetic field from an upper pole layer to a lower pole layer in a thin-film magnetic head with a narrow track width operating at a high frequency range.
Figure 3:
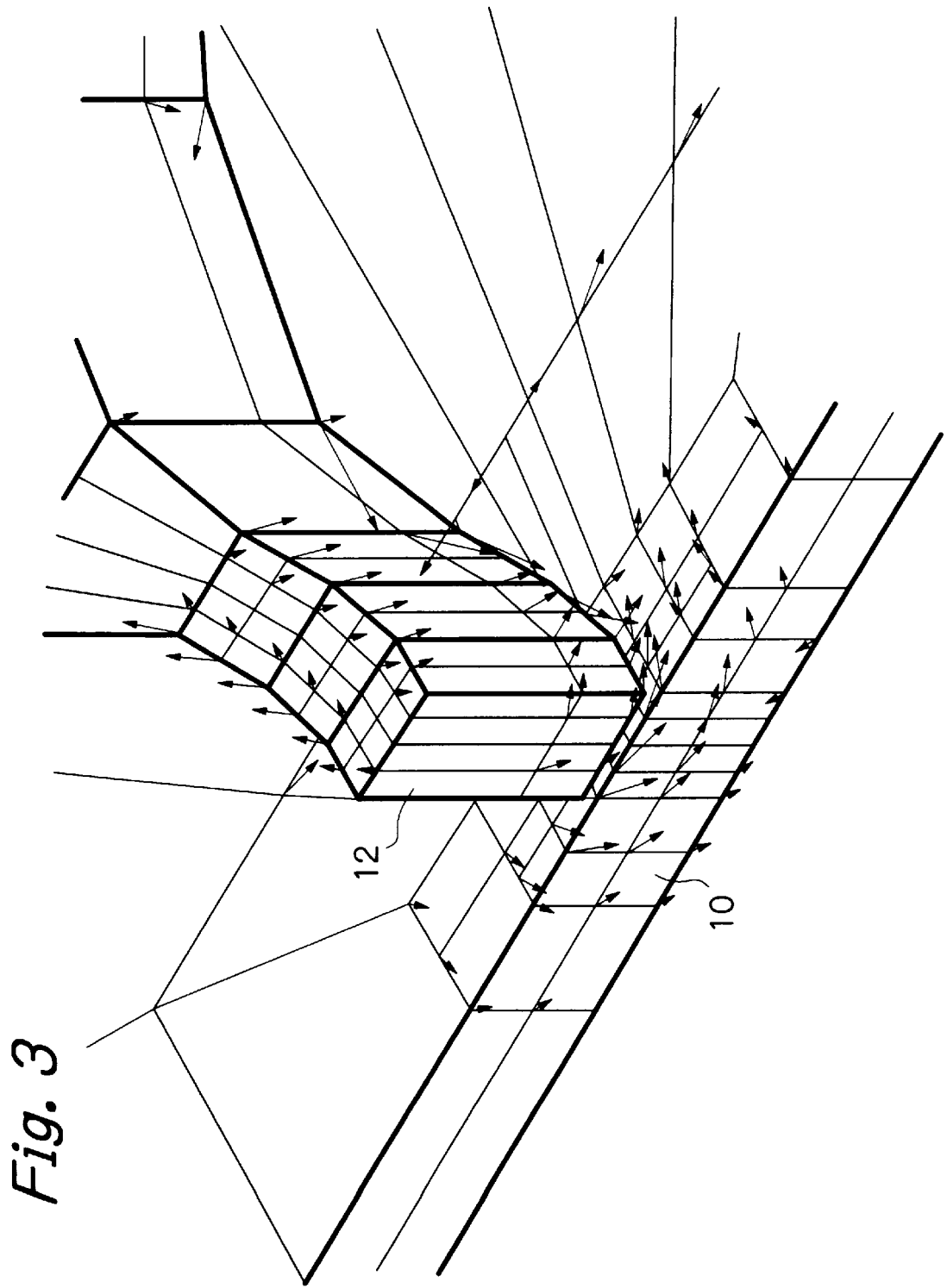
FIG. 3 illustrates distribution of eddy current in the thin-film magnetic head with a narrow track width operating at a high frequency range.

FIG. 2 illustrates distribution of magnetic field from the upper pole layer 12 to the lower pole layer 10 in the magnetic head with a narrow track width operating at a high frequency range, and FIG. 3 illustrates distribution of eddy current in the magnetic head. As shown by arrows in FIG. 2, the leakage magnetic fields with relatively larger values are generated at the side end portions of the upper pole layer 12. Whereas, as shown by arrows in FIG. 3, the eddy currents flow toward directions to cancel out the generated leakage magnetic fields.

According to this embodiment, the non-magnetic conductive material members 13 and 14 are disposed on the lower pole layer 10 so that the members 13 and 14 are in contact with the respective side surfaces, facing toward the track width direction, of the front end portion 12a of the upper pole layer 12 and also in contact with the lower pole layer 10. A part of the magnetic flux produced by drive current flowing through a coil and concentrated in the front end portion 12a easily leaks to the lower pole layer 10 through these members 13 and 14. However, the eddy current generated in these members 13 and 14 cancels out the leaking magnetic flux. Therefore, the leakage magnetic field is prevented from being generated resulting in an increase in the magnetic field passing through the recording gap 11.

Figure 4:
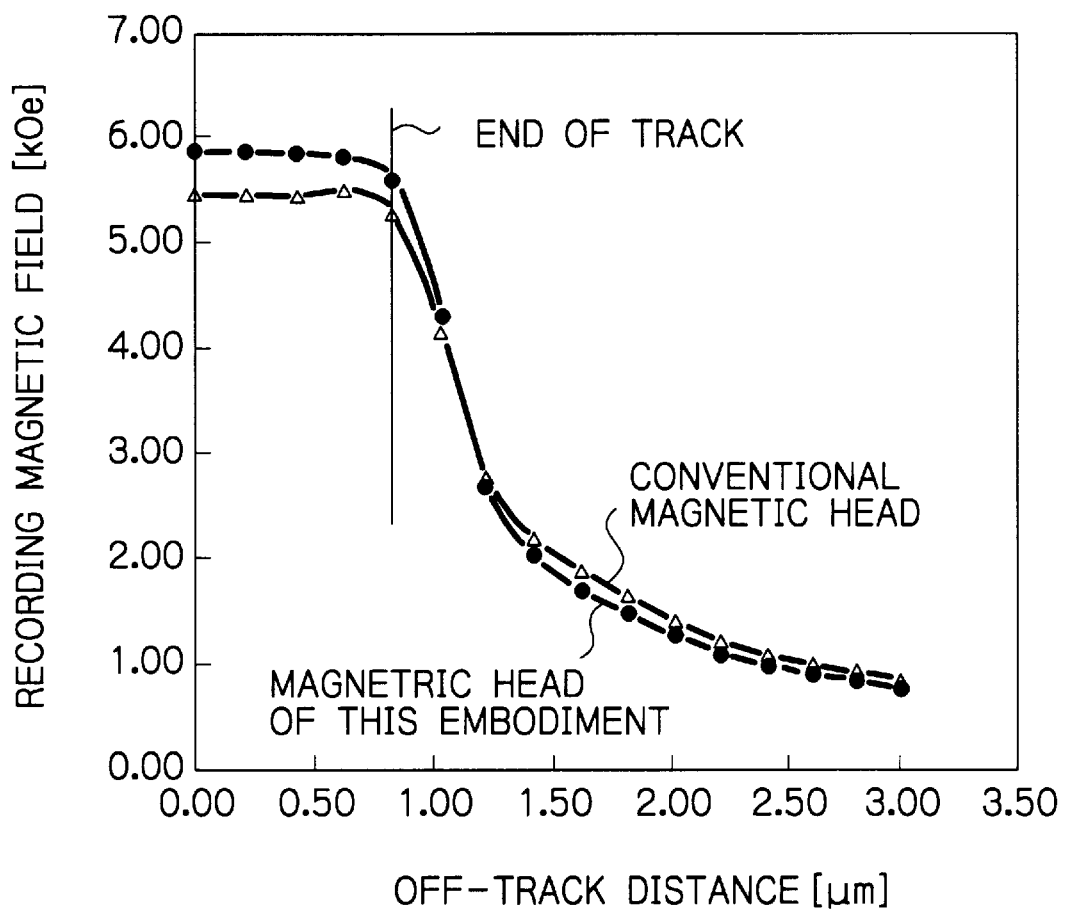
FIG. 4 illustrates the result of the magnetic field analysis for leakage magnetic fields directed toward the track width direction in and around the recording gaps with respect to the conventional magnetic head and to the magnetic head of the embodiment shown in FIG. 1.

FIG. 4 illustrates the result of the magnetic field analysis for leakage magnetic fields directed toward the track width direction in and around the recording gaps with respect to the conventional magnetic head and to the magnetic head of the embodiment shown in FIG. 1. In FIG. 4, the horizontal axis indicates an off-track distance or a distance from the center of the track, and the vertical axis indicates an intensity of the recording magnetic field.

As will be apparent from the figure, the magnetic filed in the recording gap 11 in the magnetic head of this embodiment is stronger than that in the conventional magnetic head, and the leakage magnetic field out of the track end in the magnetic head of this embodiment is less than that in the conventional magnetic head. Therefore, according to this embodiment, not only the leakage magnetic field is suppressed but also the magnetic field passing through the recording gap increases. Thus, the magnetic head or this embodiment is suitable for high density recording.

Figure 5:
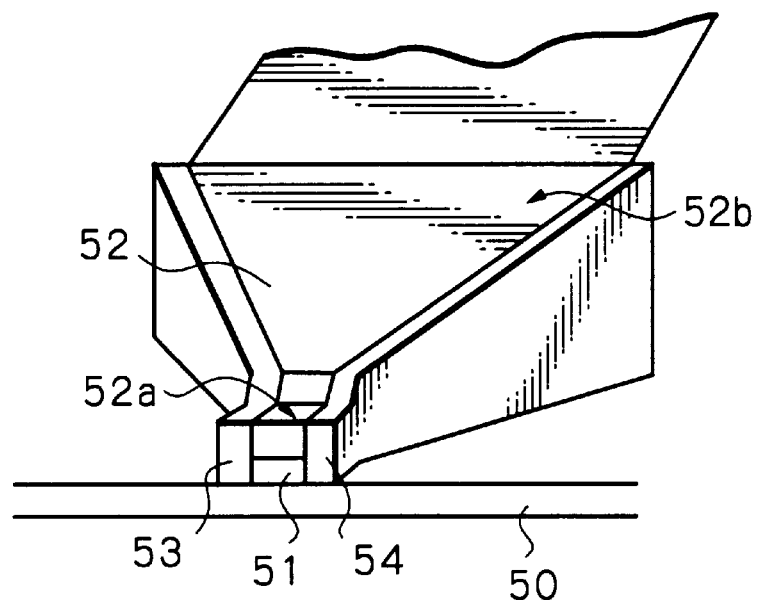
FIG. 5 shows an oblique view schematically illustrating a structure of a pole portion of a thin-film magnetic head in another embodiment according to the present invention.

FIG. 5 schematically illustrates a structure of a pole portion of a thin-film magnetic head in another embodiment according to the present invention, and is an oblique view seen from the ABS of the head.

In the figure, reference numeral 50 denotes a lower magnetic pole layer of the inductive head part. This pole layer 50 also operates as an upper shield layer for the MR head part. In the figure, furthermore, reference numeral 51 denotes a recording gap layer, 52 denotes an upper magnetic pole layer, and 53 and 54 denote a pair of non-magnetic conductive material members formed on the layer 50 in contact with respective side surfaces (track end surfaces facing toward the track width direction) of the upper pole layer 52 from its front end portion 52a to its sloped portion 52b.

According to this embodiment, the non-magnetic conductive material members 53 and 54 are disposed on the lower pole layer 50 so that the members 53 and 54 are in contact with the respective side surfaces, facing toward the track width direction, of not only the front end portion 52a but also the sloped portion 52b of the upper pole layer 52 and also in contact with the lower pole layer 50. The magnetic flux also easily leaks through the side surfaces of the sloped portion 52b. Thus, it is very effective to suppress the magnetic flux leaking from the sloped portion 52b by the eddy current generated in these members 53 and 54 which also covers the side end faces of the sloped portion 52b. Therefore, the leakage magnetic field can be more effectively prevented from generation resulting the magnetic field passing through the recording gap 51 to increase. Another configurations and advantages in this embodiment are the same as these in the embodiment of FIG. 1.

Figure 6:
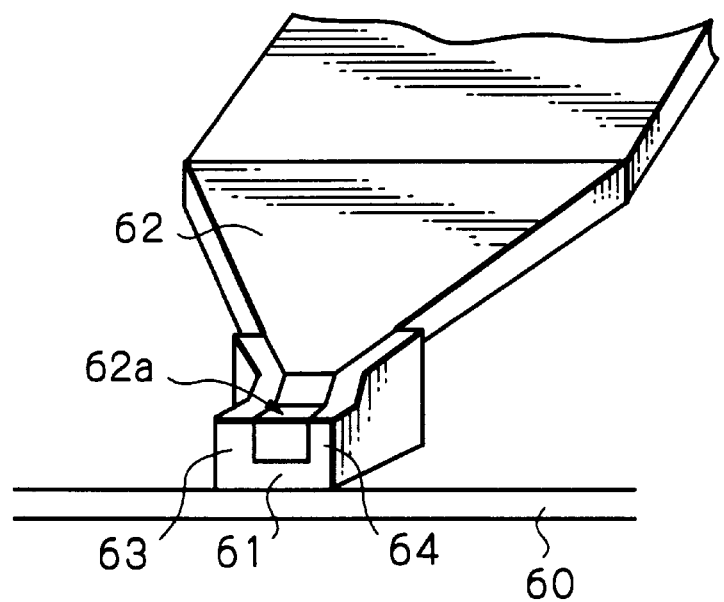
FIG. 6 shows an oblique view schematically illustrating a structure of a pole portion of a thin-film magnetic head in a further embodiment according to the present invention.

FIG. 6 schematically illustrates a structure of a pole portion of a thin-film magnetic head in a further embodiment according to the present invention, and is an oblique view seen from the ABS of the head.

In the figure, reference numeral 60 denotes a lower magnetic pole layer of the inductive head part. This pole layer 60 also operates as an upper shield layer for the MR head part. In the figure, furthermore, reference numeral 61 denotes a recording gap layer, 62 denotes an upper magnetic pole layer, and 63 and 64 denote a pair of non-magnetic conductive material members formed on the lower pole layer 60 in contact with respective side surfaces (track end surfaces facing toward the track width direction) of the front end portion 62a of the upper pole layer 62 and also in contact with the layer 60.

According to this embodiment, the gap layer 61 is made of the same material as that of the non-magnetic conductive material members 63 and 64, and integral with the members 63 and 64. Thus, the leakage flux passing through the gap layer 61 can be suppressed by the eddy current generated in these members 63 and 64. Therefore, the leakage magnetic field can be more effectively prevented from generation resulting the magnetic field passing through the recording gap 61 to more increase. Another configurations and advantages in this embodiment are the same as these in the embodiment of FIG. 1.

Figure 7:
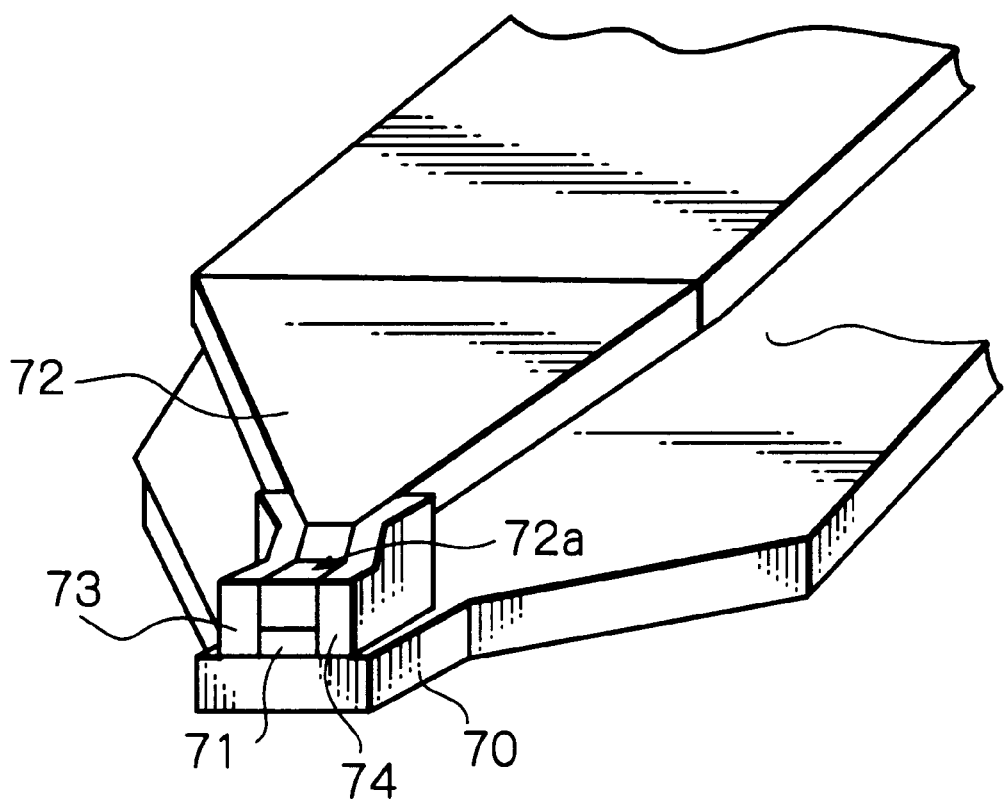
FIG. 7 shows an oblique view schematically illustrating a structure of a pole portion of a thin-film magnetic head in a still further embodiment according to the present invention.

FIG. 7 schematically illustrates a structure of a pole portion of a thin-film magnetic head in a still further embodiment according to the present invention, and is an oblique view seen from the ABS of the head. In this embodiment, the magnetic head is a recording head with only an inductive recording head part.

In the figure, reference numeral 70 denotes a lower magnetic pole layer, 71 denotes a recording gap layer, 72 denotes an upper magnetic pole layer, and 73 and 74 denote a pair of non-magnetic conductive material members formed on the lower pole layer 70 in contact with respective side surfaces (track end surfaces facing toward the track width direction) of the front end portion 72a of the upper pole layer 72 and also in contact with the layer 70. Configurations and advantages in this embodiment are the same as these in the embodiment of FIG. 1 except that the magnetic head in this embodiment is the recording head constituted by only the inductive recording head part.

Many widely different embodiments of the present invention may be constructed without departing from the spirit and scope the present invention. It should be understood that the present invention is not limited to the specific embodiments described in the specification, except as defined in the appended claims.

What is claimed is:

1. A thin-film magnetic head comprising:

a recording gap layer;

lower and upper magnetic pole layers deposited to sandwich said recording gap layer, said upper magnetic pole layer having an upper surface, said upper magnetic pole layer having a front end portion and a sloped portion located behind said front end portion, and side surfaces facing toward a track width direction; and non-magnetic conductive material members being in contact with said respective side surfaces of said upper magnetic pole layer from said front end portion to said sloped portion and in contact with said upper surface of said lower magnetic pole layer.

2. The head as claimed in claim 1, wherein said upper magnetic pole layer has a front end portion, and wherein said non-magnetic conductive material members are in contacts with a part of said respective side surfaces of said upper magnetic pole layer at least, around said front end portion.

3. The head as claimed in claim 1, wherein said upper magnetic pole layer has a front end portion and a sloped portion located behind said front end portion, and wherein said non-magnetic conductive material members are in contact with a part of said respective side surfaces of said upper magnetic pole layer from said front end portion to said sloped portion.

4. The head as claimed in claim 1, wherein said non-magnetic conductive material members are integral with said recording gap layer.

5. The head as claim in claim 1, wherein said magnetic head is an integral composite thin-film magnetic head with an inductive recording head part and a magnetoresistive reproducing head part.

6. The head as claimed in claim 1, wherein said magnetic head is a thin-film magnetic head with only an inductive recording head part.

7. The head as claimed in claim 1, wherein said non-magnetic conductive material members extend past said front end portion of said upper pole layer to contact side surfaces of said sloped portion of said upper pole layer.

* * * * *

UNITED STATES PATENT AND TRADEMARK OFFICE
CERTIFICATE OF CORRECTION

PATENT NO. : 6,031,696
DATED : February 29, 2000
INVENTOR(S) : Yamanaka

It is certified that error appears in the above-identified patent and that said Letters Patent is hereby corrected as shown below:

Title page, item [54] and col. 1, delete "THIN-FILM MAGNETIC HEAD HAVING CONDUCTIVE MATERIAL CONTACTING SIDES OF THE UPPER POLE LAYER AND AN UPPER SURFACE OF THE LOWER POLE LAYER", and insert --THIN-FILM MAGNETIC HEAD HAVING CONDUCTIVE MATERIAL MEMBERS CONTACTING SIDES OF THE UPPER POLE LAYER AND AN UPPER SURFACE OF THE LOWER POLE LAYER--

Signed and Sealed this

Sixth Day of February, 2001

Attest:

Q. TODD DICKINSON

Attesting Officer

Director of Patents and Trademarks